United States Patent
Musat

(10) Patent No.: US 6,330,171 B2
(45) Date of Patent: Dec. 11, 2001

(54) LC FILTERING WITH PREBIASED INDUCTOR FOR A CHOPPING CIRCUIT

(75) Inventor: Ciprian Musat, Creteil (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/742,018

(22) Filed: Dec. 22, 2000

(30) Foreign Application Priority Data

Dec. 28, 1999 (FR) .................................................. 99 16572

(51) Int. Cl.[7] ...................................................... H02J 1/02
(52) U.S. Cl. ................. 363/39; 363/91; 363/124; 323/329; 323/330; 323/362
(58) Field of Search ..................... 323/249, 250, 323/329, 330, 362; 363/39, 47, 91, 1.24

(56) References Cited

U.S. PATENT DOCUMENTS

| | | | |
|---|---|---|---|
| 3,671,810 | * | 6/1972 | Barnes et al. . |
| 4,230,955 | * | 10/1980 | Johannessen ......................... 363/124 |
| 4,985,819 | | 1/1991 | Mori et al. .............................. 363/37 |
| 5,773,969 | * | 6/1998 | Nakayama et al. ................... 323/330 |
| 5,889,373 | * | 3/1999 | Fisher et al. .......................... 323/250 |
| 6,166,931 | * | 12/2000 | Mueller .................................. 363/47 |

FOREIGN PATENT DOCUMENTS 628421    8/1963   (BE) .

OTHER PUBLICATIONS

Patent Abstract of Japan, Pub. No. 62048257, Pub. Date Mar., 1987.

* cited by examiner

Primary Examiner—Jeffrey Sterrett
(74) Attorney, Agent, or Firm—Liniak, Berenato, Longacre & White

(57) ABSTRACT

The invention relates to a control circuit, in particular for a load in an automotive vehicle, comprising a chopping circuit, at least one LC filter (F1) means (20) opposing the saturation of the inductor, (L1) of this LC circuit, wherein these latter means (20) are provided so as to prebias the inductor in a chosen direction.

14 Claims, 4 Drawing Sheets

LC FILTERING WITH PREBIASED INDUCTOR FOR A CHOPPING CIRCUIT

BACKGROUND OF THE INVENTION

1. Field of the Invention

The present invention relates to control circuits with chopping means used in particular in automotive vehicles, for example to power window lifters, windscreen wipers, robotized gearboxes or steering column adjustment systems.

2. Description of the Related Art

Represented in FIG. 1 is such a circuit, here a pulse width modulation (PWM) circuit which conventionally includes a source 5 delivering a supply voltage $V_{bat}$, followed by a low-pass filter 10 and then a chopping circuit 15 with two outputs A and B, and filtering circuits F1, F2 installed at these two outputs A and B. A load CH has its terminals connected at the output of the filters F1 and F2.

The chopping circuit 15 (or converter), typically a bridge of circuit breakers forming a chopping type bidirectional voltage source (here an H bridge), delivers two signals with variable pulse width on the two outputs A and B.

The role of the filtering circuits F1 and F2 is to reduce the electromagnetic disturbances (EMC) generated by the chopping (chopping noise), especially when the load CH is far from the chopping circuit 15 (this same type of filter is also used at the input of converters).

The load CH is traversed by a current I (load current) which is substantially continuous although it can change direction in certain applications, as a function of the sign of a control voltage.

According to a first conventional example, F1 and F2 are both formed by an LC circuit (such as that represented in FIG. 2 with reference to F1), whose coil L1 links an output of the power circuit 15 to a terminal of the load CH, and whose capacitor C1 links this same terminal of the load CH to ground.

These known circuits remain rather unsatisfactory, in particular when the load CH is to be supplied in both directions, such as for example for electric motors of certain applications, since the load current I may reach a high enough value to saturate the coil L1, which then exhibits decreased inductance, denying the LC circuit its role as filter. Particularly significant electromagnetic disturbances are then obtained at the terminals of the load CH.

Moreover, the capacitor C1 is then linked directly to the output of the circuit 15, reducing the efficiency of the latter, and, because the chopped voltage exhibits high spans and low spans of different durations, the capacitor C1 can charge up to its maximum capacitance.

For this reason, it is often necessary to limit the capacitance of the capacitor C1. However, in this case the filter exhibits a high impedance, and, because it is in series with the load CH, it forms a voltage divider. Consequently, here again the converter 15 generates electromagnetic disturbances at the terminals of the load CH.

It has indeed been proposed that coils having a higher inductance be installed, but they are expensive and bulky and dissipate heat.

The inductance can reasonably reach 10 $\mu$H with a saturation current of 15 to 20 A and the capacitance may reach a value of 20 $\mu$F maximum.

It has been proposed (FIG. 3) that an LC circuit be arranged at the output of each of the two branches of such a chopping circuit and that the coils of the two circuits be wound around the same core.

Each coil is traversed by a current whose average is substantially the load current. The coils therefore induce average magnetic fields having opposite directions and substantially equal values, regardless of the direction of the load current.

The magnetic fields therefore compensate one another, thereby giving a zero mean flux and protecting the coil from saturation. This type of circuit applies in particular when the load is inductive, and the common core used is for example a toroidal core. In such a device, a capacitor is necessarily installed on each side of the load.

Such a device requires complex adaptations and a large number of components. It is therefore still fairly expensive.

SUMMARY OF THE INVENTION

The main aim of the present invention is to solve the aforesaid drawbacks, that is to say to propose a chopping type control circuit, and upstream or downstream filtering, which is inexpensive and produces effective filtering.

Such a circuit is a control circuit, in particular for a load in an automotive vehicle, comprising a chopping circuit, at least one LC filter, means opposing the saturation of the inductor of this LC circuit, wherein these latter means are provided so as to prebias the inductor in a chosen direction.

Other characteristics, aims and advantages of the invention will become apparent on reading the detailed description which follows, given with reference to the appended drawings in which:

DETAILED DESCRIPTION OF THE PREFERRED EMBODIMENTS

The circuit which will be described now (here a pulse width modulation circuit), readopts the general structure of the circuit of FIG. 1 and the same numerical references will be used for the similar elements already described.

Moreover, only the filter F1 will be described, the filter F2 being identical.

Figure 4:
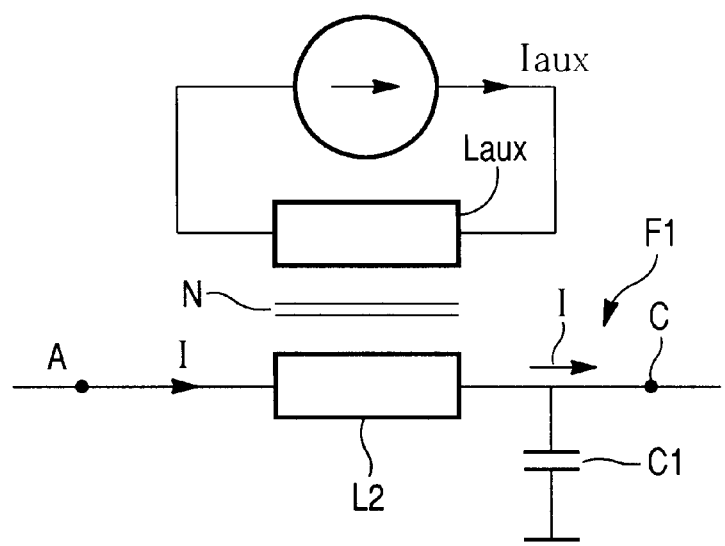
FIG. 4 represents a filtering circuit according to a first variant of the invention.

As represented in FIG. 4, the filter F1 is, here again, an LC circuit whose coil L1 links the output A of the power circuit 15 to a terminal C of the load CH, this same terminal being linked to ground by way of a capacitor C1.

An auxiliary winding $L_{aux}$ is wound as one and the same element with the coil L1 around one and the same magnetic core N.

The auxiliary winding $L_{aux}$ is permanently energized by a current $I_{aux}$ directed in a direction going from the load CH to the power circuit 15. This auxiliary winding therefore induces an opposite field to that generated by the coil L1 when this coil L1 is traversed by a load current I going from the power circuit 15 to the load CH.

The coil L1 is thus prebiased in a direction which increases the threshold beyond which such a current I, of outgoing direction, saturates the coil L1.

Since here the load is highly inductive in nature, the load current is particularly stable here.

The current $I_{aux}$ is here a current which keeps the same direction and the same magnitude over time, so that the coil L1 is, conversely, more easily saturable by a load current I of opposite direction, that is to say coming from the load CH and directed toward the power circuit 15.

The prebias therefore conversely reduces the threshold beyond which a re-entrant current I saturates the coil L1.

This property is utilized in the present circuit.

Because one and the same coil L1 exhibits a high inductance (since it is desaturated) for an outgoing current and a low inductance (since it is saturated) for an incoming current, effective filtering is obtained in one direction and an almost direct link from the load CH to the power circuit 15 is obtained in the other direction, at the working frequency.

One and the same filter therefore exhibits upstream an impedance (input impedance) which is high, and downstream an impedance (output impedance) which is low.

Figure 1:
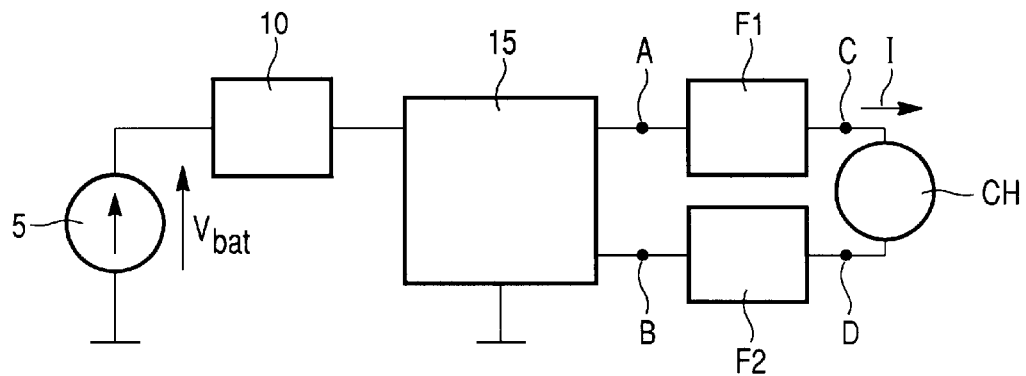
FIG. 1 represents a circuit according to the state of the art.
Figure 2:
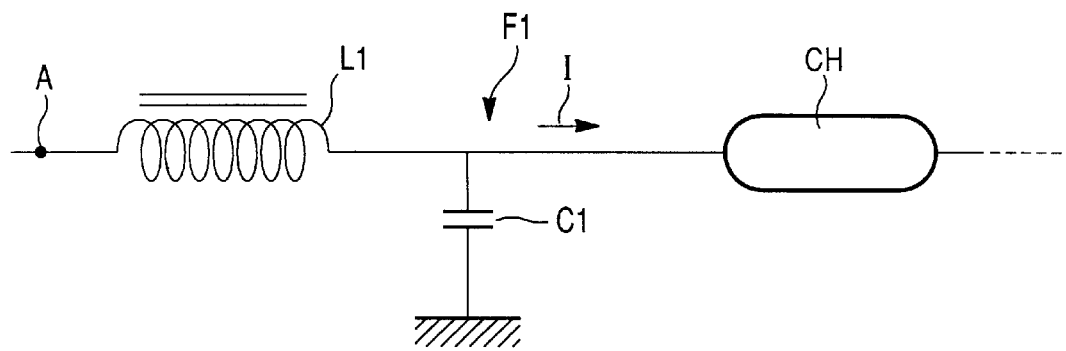
FIG. 2 represents a filtering circuit according to a first variant of the state of the art.
Figure 3:
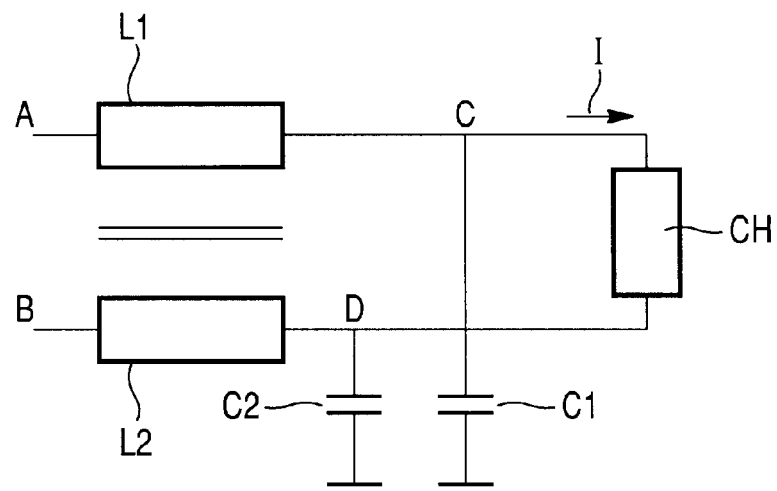
FIG. 3 represents a filtering circuit according to a second variant, with common core, of the state of the art.

By simplification, when the load current I is directed in the direction of the arrow of FIG. 1, that is to say from the filter F1 to the filter F2, the filter F1 is activated (since it is desaturated) and the filter F2 exhibits minimum impedance (since it is saturated). The filter F2 does not therefore constitute a voltage divider in relation to the output from the filter F1. The filter F1 is therefore particularly effective, with a particularly high energy efficiency.

There is moreover provision that, of the outputs A and B of the power circuit 15, only that one which delivers a mean outgoing current is the origin of a chopped voltage, the re-entrant output being, for its part, linked to ground across the chopping circuit 15 and capacitors.

Thus, permanently, one output of the power circuit 15 exhibits a chopped voltage, and the other output is grounded.

Figure 5:
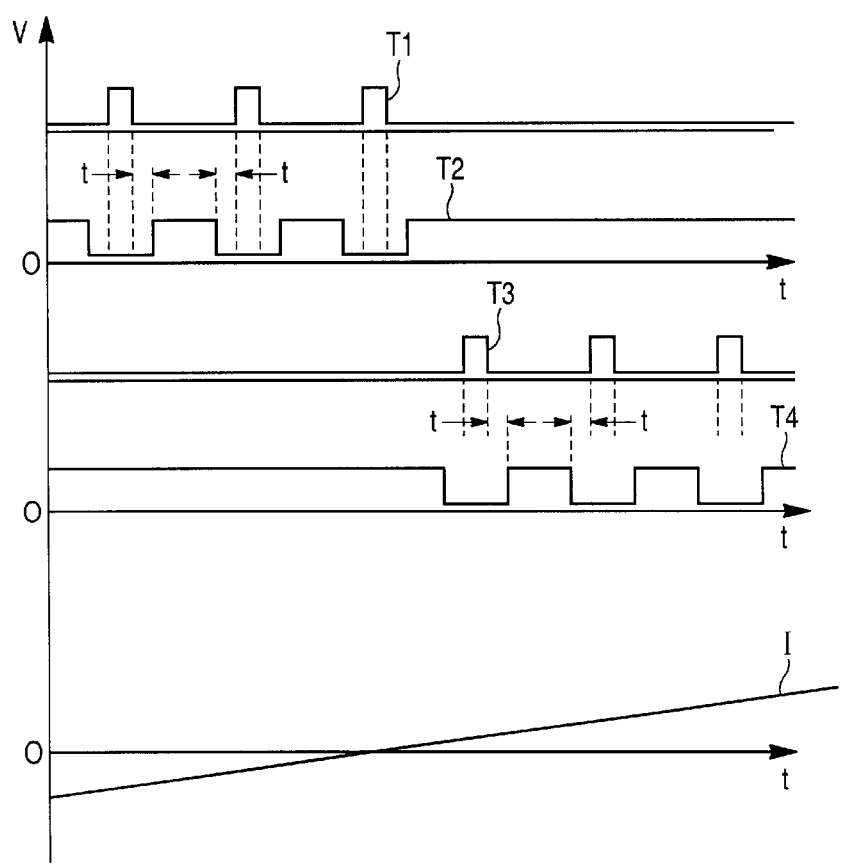
FIG. 5 is a control sequencing plot for transistors of an H bridge according to the invention.

Such an arrangement is easily obtained by connecting the filters F1 and F2 onto diagonally opposite terminals of the H bridge and with a control voltage sequencing of the transistors of the H bridge such as represented in FIG. 5.

Figure 6:
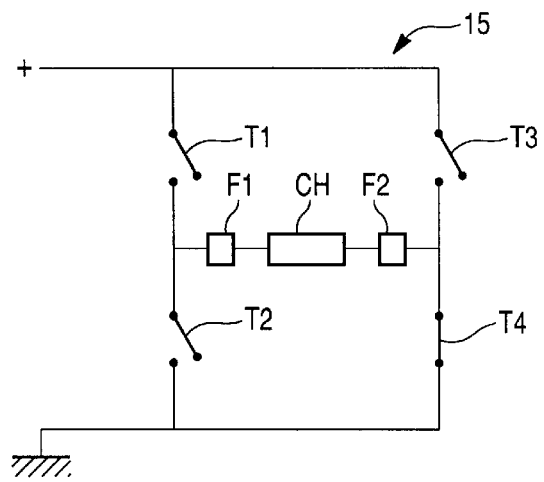
FIG. 6 represents an H bridge according to the invention in a first phase corresponding to a load current having a first direction.
Figure 7:
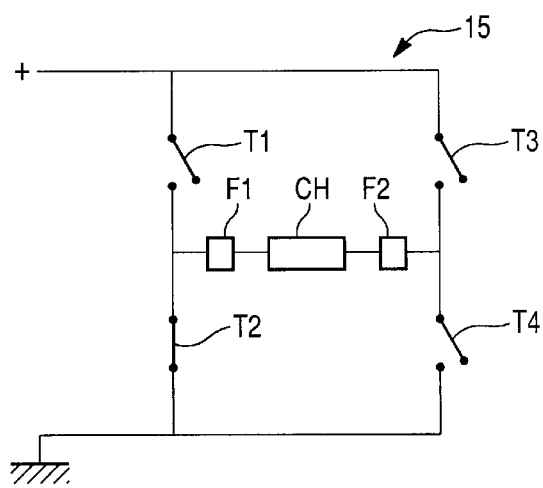
FIG. 7 represents this same H bridge in another phase where the load current has an opposite direction.

Represented in FIG. 5 are four control signals for the four transistors T1, T2, T3, T4 of an H bridge such as that represented in FIGS. 6 and 7.

In these figures, the bridge 15 is a conventional H bridge, the horizontal bar of which carries in series the load CH and the filtering circuits F1 and F2, and the vertical branches of which each carry two transistors, installed respectively either side of a terminal of a filter, one of the transistors being able to link this terminal to ground and the other being able to link this terminal to the supply voltage.

In the first phase of the plot of FIG. 5, the transistors T1 and T2 of the left branch switch in phase opposition, whilst, in the other branch, the transistor T4 remains immobile and closed, grounding the corresponding terminal of the filter F2. The transistor T3, installed between this same terminal and the supply voltage, is itself open. Thus, the filter F1, situated on the left, is supplied with a chopped voltage, whilst the filter F2, situated on the right, is grounded by the H bridge. A current I passes through the load CF from left to right.

In the second phase of the plot of FIG. 5, the transistors T1 and T2 of the left branch remain immobile, the transistor T2 on the ground side being closed and the other transistor T1 on the supply side being open, linking the filter F1 to ground. The transistors T3 and T4 of the right branch switch, for their part, in phase opposition, delivering a chopped voltage on the filter F2. A current I then passes through the load CH from right to left.

As represented in FIG. 5, care is taken, upon corresponding switchings of two transistors of one and the same branch, to comply with a slight idle time t between the switching control signals of the two transistors, this idle time t corresponding to an intermediate state where the two transistors of the branch both receive a control signal instructing opening. In this way one makes certain that it is not possible to establish a short circuit between the supply and ground, despite a delay of one of the transistors between the reception of its opening signal and its actual opening.

The voltage across the terminals of the load CH and the current in the load CH are proportional to the ratio of the duration of the high spans to the duration of the low spans at the relevant instant. Hence, the longer the high spans relative to the low spans on the output which is the origin of the chopped voltage, the higher the current.

The ratio of the durations of the spans is, by way of a control provision not represented, proportional to a control voltage V. Moreover, it is A or B which is the origin of the chopped voltage, depending on whether V is positive or negative.

Apart from the gain in energy yield, the electromagnetic disturbances are particularly reduced because just one of the terminals of the circuit 15 is disturbed. The effectiveness of the filter which is activated, from the point of view of the electromagnetic disturbances, is furthermore particularly improved by the grounding of the opposite terminal of the load CH.

It will be noted that a return current is set up in the coil linked to ground and the corresponding capacitor discharges across this coil.

The coil, saturated during this phase, therefore allows very rapid discharging of the corresponding capacitor, hence almost instantaneous grounding of the corresponding terminal of the load CH.

One terminal of the load CH is therefore almost instantaneously grounded across the power circuit 15 while the other terminal of the load CH goes to a positive potential by way of an active filter, with high impedance.

The filter proposed here exhibits the advantage of calling upon only a simple coil, for which one does not seek permanently to avoid saturation by a complex structure.

Preferably, the number of turns used for the auxiliary coil is considerable, greater than that of the coiling of the coil L1, so as to obtain a sufficient field with a low current $I_{aux}$. The current $I_{aux}$ is adjusted and the prebias is modified if necessary.

Figure 8:
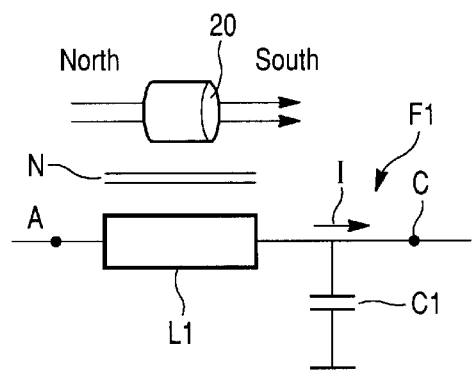
FIG. 8 represents a filtering circuit according to a second variant of the invention.

According to another embodiment of the invention, as represented in FIG. 8, the prebiasing of the coil L1 is achieved with the aid of a permanent magnet 20. One chooses a magnet 20 whose magnetic field desaturates the core of the coil L1 when the mean current I is outgoing, and whose magnetic field gives rise to the saturation of the core when the mean current I is re-entrant.

Figure 9:
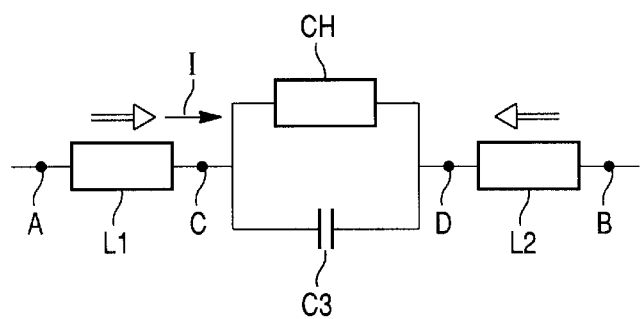
FIG. 9 represents a filtering circuit according to a third variant of the invention.

According to another embodiment represented in FIG. 9, the coils L1 and L2 of the two filtering circuits F1 and F2 are prebiased and one and the same capacitor C3 is used for both filtering circuits.

This capacitor C3 is installed in parallel with the load CH, between the two coils L1 and L2. For the load CH as for the capacitor C3, its terminals are linked respectively to the output terminal of each of the coils L1 and L2.

When a coil L1, previously traversed by an goutgoing mean current from the circuit 15, is thereafter connected to ground by the circuit 15, that terminal of the capacitor C3 which is linked thereto is itself grounded almost instantaneously (since the coil L1, then saturated, becomes passing), and the single capacitor C3 discharges almost instantaneously.

The capacitor C3 therefore becomes available almost instantaneously to fulfil its filtering function with the other coil L2 which becomes outgoing. It links the coil L2 to ground, in the manner of the usual LC circuits, here across the saturated coil L1 and the power circuit 15.

Upon a change of direction of the load current I, the coils L1 and L2 behave oppositely.

This variant of the invention is particularly beneficial in that it makes it possible to employ just one capacitor, capacitors being particularly expensive, in particular more expensive than coils.

The present filters according to the invention have been described at the output of a power circuit. They can however be used at. the input of the latter (at the input or at the output of a converter).

Thus, according to a variant, the low-pass circuit 10, installed between the voltage source 5 and the chopping circuit 15, is constructed for filtering pulsatile consumption by the circuit 15, in the form of an LC circuit furnished with means for prebiasing its coil. These prebiasing means apply a constant field, opposite to that induced by the mean supply current which goes from the coil 5 to the circuit 15.

These means are typically constructed in a similar manner to those described earlier, and here again one avoids saturation of this coil by the supply current of the H bridge with simple and inexpensive means.

What is claimed is:

1. A control circuit, in particular for a load in an automotive vehicle, comprising a chopping circuit, at least one LC filter (10, F1, F2), prebiasing means (20, $L_{aux}$) opposing the saturation of the inductor (L1, L2) of the at least one LC filter, wherein the prebiasing means (20, $L_{aux}$) are provided so as to prebias the inductor in a chosen direction.

2. The circuit as claimed in claim 1, wherein the chopping circuit (15) delivers a chopped signal on two different outputs (A, B), and comprises an output LC filter on each of the outputs (A, B) and wherein the prebiasing means (20, $L_{aux}$) are provided to also protect an inductor (L1, L2) of at least one of the output LC filters from saturation if the current (I) in the inductor is outgoing toward the load (CH) and so as to saturate the inductor (L1, L2) if the current (I) is re-entrant from the load (CH).

3. The circuit as claimed in claim 2, wherein the chopping circuit (15) delivers a chopped signal on only one of its outputs (A, B) at a time.

4. The circuit as claimed in claim 2, wherein the chopping circuit (15) is provided so as to ground one of its two outputs (A, B) which is the origin of the re-entrant current.

5. The circuit as claimed in claim 4, wherein the chopping circuit (15) delivers a chopped signal on one or the other of its outputs (A, B) depending on the sign of a control voltage (V).

6. The circuit as claimed in claim 4, wherein the chopping circuit (15) is an H bridge furnished with means for controlling:
   a) switching in phase opposition two switches (T1, T2, T3, T4) of a branch of the bridge and, simultaneously
   b) maintaining an output of the bridge (15) grounded by the closing of a switch (T2, T4) of the other branch of the bridge.

7. The circuit as claimed in claim 2, wherein the two output LC filters (F1, F2) have a capacitive element (C3) in common.

8. The circuit as claimed in claim 7, wherein the capacitive element (C3) is installed in such a way that its terminals are linked to those of the load (CH).

9. The circuit as claimed in claim 1, wherein the chopping circuit (15) is an H bridge and which is furnished with means for controlling the switches of the bridge which upon a quasi-simultaneous switching of two switches (T1, T2, T3, T4) of one and the same branch, the two switches both receive, during a short instant (t), a control signal instructing opening.

10. The control circuit as claimed in claim 1, wherein the at least one LC filter (10) is installed upstream of the chopping circuit (15) and downstream of a supply source (5) of the chopping circuit (15).

11. The circuit as claimed in claim 1, wherein the prebiasing means (20, $L_{aux}$) comprises a permanent magnet (20).

12. The circuit as claimed in claim 1, wherein the prebiasing means (20, $L_{aux}$) comprises an induction coil ($L_{aux}$).

13. A control process, in particular for a load (CH) of an automotive vehicle, in which a supply signal is chopped, a signal is filtered with the aid of an LC filter (F1, F2, 10) and a saturation of the inductor (L1, L2) of the LC filter is opposed, wherein the inductor (L1, L2) is prebiased (20, $L_{aux}$) in a chosen direction.

14. The process as claimed in claim 13, wherein two chopped signals are delivered on two terminals (A, B), these signals are filtered with the aid of two LC filters (10, F1, F2), and at least one of the inductors (L1, L2) of these two LC filters (10, F1, F2) is prebiased so as to protect it from saturation if the current (I) is outgoing toward the load (CH) and to saturate it if the current (I) is re-entering from the load (CH).

* * * * *